No. 12,340. REISSUED MAY 2, 1905.
G. I. KING.
LOW SIDE GONDOLA CAR.
APPLICATION FILED DEC. 13, 1902.
3 SHEETS—SHEET 1.
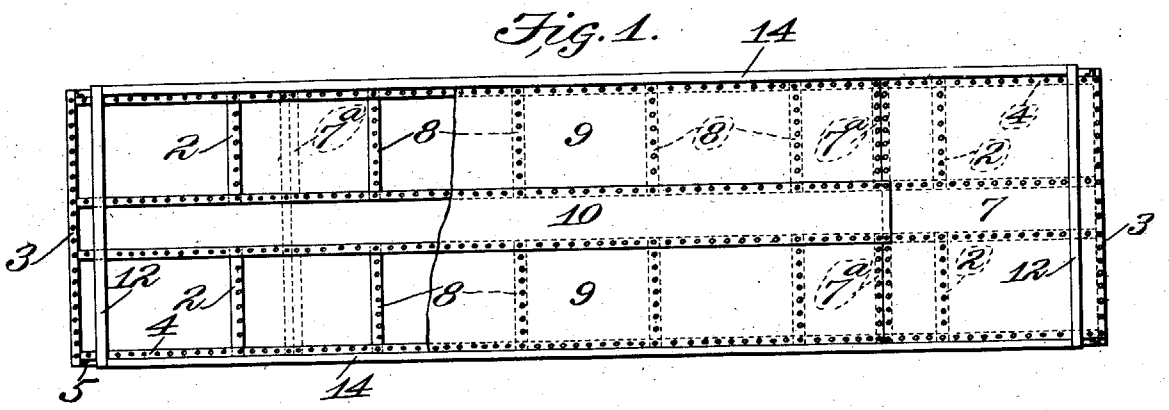
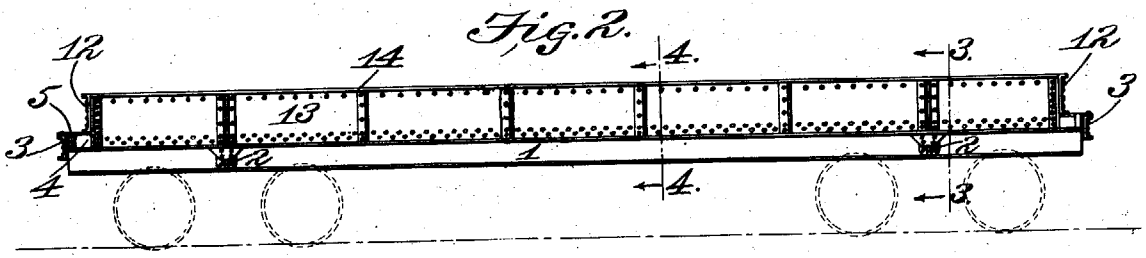
Witnesses:
G. A. Pennington
George Bakewell
Inventor:
George I. King,
by R. Bakewell & Corwall
Attys.

No. 12,340. REISSUED MAY 2, 1905.
G. I. KING.
LOW SIDE GONDOLA CAR.
APPLICATION FILED DEC. 13, 1902.
3 SHEETS—SHEET 2.
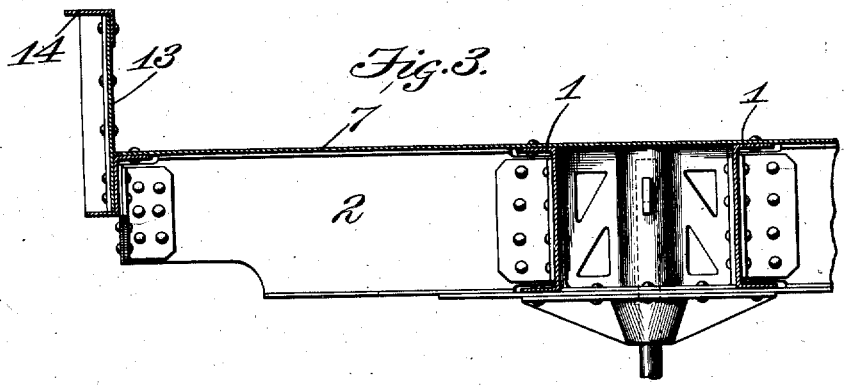
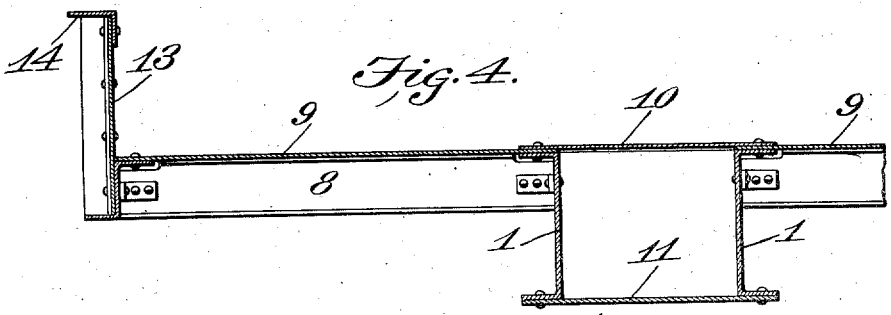
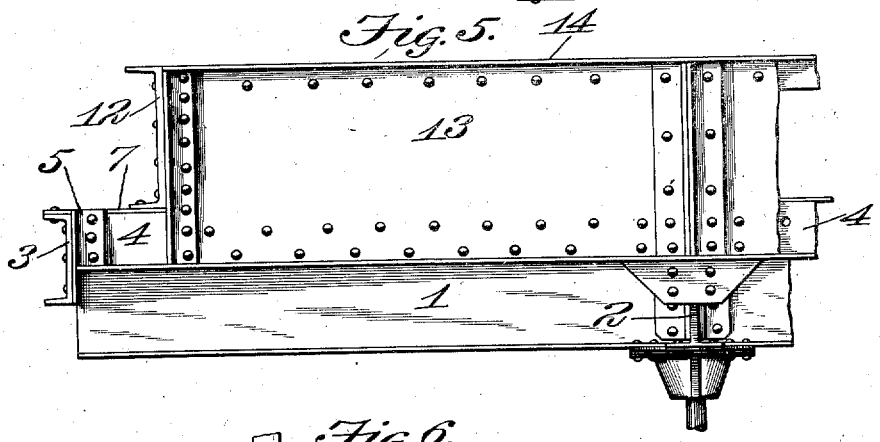
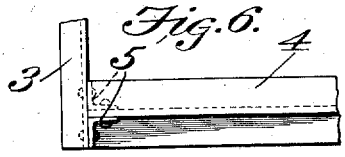
Witnesses:
G. A. Pennington
George Bakewell
Inventor:
George I. King,
by Bakewell & Cornwall
Attys.

No. 12,340. REISSUED MAY 2, 1905.

G. I. KING.

LOW SIDE GONDOLA CAR.

APPLICATION FILED DEC. 13, 1902.

3 SHEETS—SHEET 3.

Witnesses:

G. A. Pennington

George Bakewell

Inventor:

George I. King, by Bakewell & Cornwall

Attys.

No. 12,340. Reissued May 2, 1905.

UNITED STATES PATENT OFFICE.

GEORGE I. KING, OF MIDDLETOWN, PENNSYLVANIA, ASSIGNOR TO AMERICAN CAR AND FOUNDRY COMPANY, OF ST. LOUIS, MISSOURI, A CORPORATION OF NEW JERSEY.

LOW-SIDE GONDOLA CAR.

SPECIFICATION forming part of Reissued Letters Patent No. 12,340, dated May 2, 1905.

Original No. 691,637, dated January 21, 1902. Application for reissue filed December 13, 1902. Serial No. 135,143.

*To all whom it may concern:*

Be it known that I, GEORGE I. KING, a citizen of the United States, residing at Middletown, Dauphin county, Pennsylvania, have invented a certain new and useful Improvement in Low-Side Gondola Cars, of which the following is a full, clear, and exact description, such as will enable others skilled in the art to which it appertains to make and use the same, reference being had to the accompanying drawings, forming a part of this specification, in which—

Figure 7:
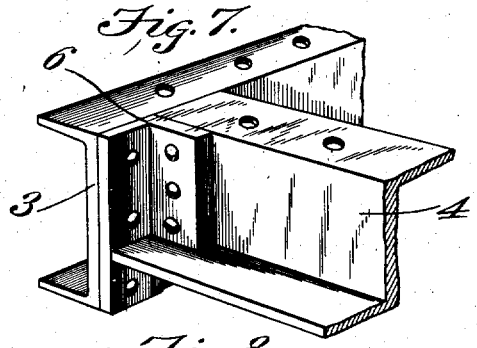
Figure 8:
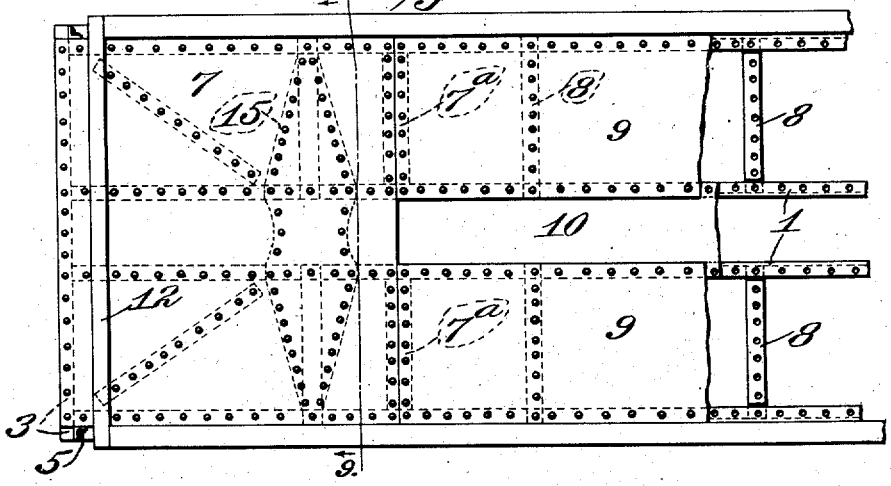
Figure 9:
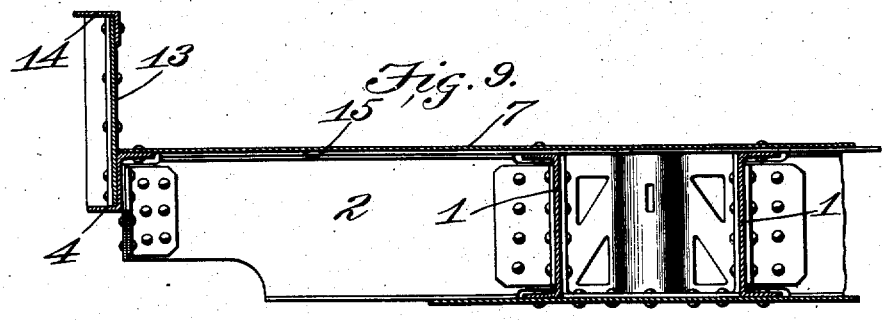

Figure 1 is a top plan view of my improved car, part of the flooring being removed at one end to show the floor-frame underneath. Fig. 2 is a side elevational view, partly in section. Fig. 3 is a sectional view on the line 3 3 of Fig. 2. Fig. 4 is a sectional view on the line 4 4 of Fig. 2. Fig. 5 is an elevational view of one end of the car. Fig. 6 is a detail plan view of the connection between the side and end sills. Fig. 7 is a detail perspective view of a modified form of connection between the side and end sills. Fig. 8 is a plan view showing a reinforcing cover-plate for the bolster, and Fig. 9 is a sectional view on line 9 9 of Fig. 8.

This invention relates to a new and useful improvement in that type of cars known as "gondola," although it is obvious that many of the details shown in the accompanying drawings and hereinafter described may be employed in other types of cars.

The objects of my present invention are to construct a car of rolled or pressed metal and to so arrange and combine the parts as to obtain the greatest strength with a comparatively small dead-weight of material used.

Another object is to simplify the construction of cars of the type mentioned, rendering the parts thereof easy of assemblage and repair.

With these objects in view the invention consists in the construction, arrangement, and combination of the several parts, all as will hereinafter be described and afterward pointed out in the claims.

In the drawings, 1 indicates the center sill, which is preferably composed of two channels having their flanges presented outwardly.

2 indicates the body-bolster as an entirety, which consists, preferably, of two I-shaped webs extending between the center and side sills, a casting being employed between the center sills, as shown. A bottom cover-plate is riveted to the bottom flanges of the I-shaped webs and the center-sill channels. I do not herein claim the construction of this body-bolster.

3 indicates end sills, which may be of any form, but which are shown as consisting of channels with their flanges presented outwardly.

4 indicates the side sills, which are preferably in the form of rolled or pressed Z-bars, the bottom flanges thereof being presented outwardly, while the top flanges are presented inwardly. These side sills are connected to the ends of the bolster-webs or bolsters, as the case may be, and to the ends of the end sills by suitable connection-plates. As shown in Fig. 6, connection-plates 5 are arranged on each side of the vertical web of the Z-bar, while in Fig. 7 a single connection-plate 6 is arranged outside the vertical web of the Z-bar, the bottom flange of the Z-bar being cut away to permit the connection-plate or angle to extend to the lower edge of the end sill, which end sill, as shown, extends below the bottom flange of the side sill.

7 indicates a floor-sheet arranged at the end of the car, said floor-sheet being riveted to the top flanges of the end, center, and side sills and extending inwardly beyond the body-bolster, to which it is also riveted and of which in Figs. 1 to 5 it forms the top cover-plate, said end sheet terminating over a splice-plate 7*. Floor-beams 8, preferably in the form of channels, are secured through suitable connection-plates to the center and side sills. There are preferably a number of these floor-beams intermediate the bolsters.

9 indicates side floor-sheets riveted to the top flanges of the center and side sills, a buttjoint being formed between the ends of these side plates and the inner edges of the end plates.

10 indicates the center floor-sheet, which is preferably arranged above the side and end sheets and riveted thereto and to the top flanges of the center sills. This floor-sheet 10 also serves as a top cover-plate for the center sill. A bottom cover-plate 11 may be riveted to the bottom flanges of the center sill, if required, or lattice-bars may be provided, as is well understood.

12 indicates the end walls of the car, preferably in the form of channels, whose bottom flanges are riveted to the end sheets 7 and to the top flanges of the center and side sills. This end wall is located a short distance from the end of the car, so as to provide a platform, if desired.

In Figs. 8 and 9 I have shown the central floor-sheet as being arranged under the side and end sheets and in this manner provide a space between the end floor-sheets and the body-bolsters for the introduction of reinforcing cover-plates 15, which are arranged above the bolsters.

The side walls of the car are in the form of sheets 13, riveted to the vertical webs of the side sills, the upper edges of said side sheets having angles 14 secured thereto. These side sheets serve to carry a portion of the load and in this capacity act as plate-girders, the top angles being placed in compression and serving as compression-flanges for the plate-girder side walls, while the side sills serve as tension-flanges therefor.

From the above it will be obvious that the Z-bar side sills, with their top and bottom flanges presented as shown, perform the functions of providing angular flanges for the attachment and support of the floor-sheets and angular flanges at the bottom of the plate-girder side walls which serve as tension-flanges for the plate-girder side walls; also, that by the use of commercially-rolled Z-bars these two angular flanges are integrally connected, the vertical webs of the Z-bars affording ample attachment to the lower edges of the side walls which are riveted thereto. These Z-bars also resist buffing and pulling strains in their additional capacity as side sills, they being considerably strengthened in the performance of this last-mentioned function by the side walls attached thereto, which side walls assist in resisting buffing and pulling strains. Thus in the performance of the functions attributed to the several members of the Z-bars other commercially-rolled shapes might be employed—such, for instance, as the well-known L-shaped angles, two of which could be used and serve in every particular as well as the single Z-bar. In fact, by the use of the two L-angles they would be the exact mechanical equivalent of the single Z-bar, or, in other words, the single Z-bar would produce the two L-shaped angles referred to if its vertical web were cut on a line parallel to the flanges. By the use of two separate angles with their horizontal legs or flanges, instead of a single bar with its integrally-connected horizontal legs or flanges, such as the Z-bar shown, the two separate angles would rely upon the plate-girder side wall of the car as a connecting-web, and this side wall could be made as deep as desired or separate angles be spaced as far apart as necessary to give the required section of metal in the connecting-web. These slight variations are all included within the scope of my invention and are not illustrated in the drawings, because they are common expedients and are well known in the art of car-building.

In the following claims by the use of the term "angular flange" I intend to include all forms of flanges, whether integrally connected or separately attached to the side wall of the car or to the floor-sheet. One advantage resulting from the use of the three angular flanges shown, whether integral or separately connected to the side or floor sheets, is that the floor is supported by the intermediate flange, so that the side walls extend therebeneath and dispense with the use of heavy side sills, the side walls acting as plate-girders and assisting to resist the buffing and pulling strains. Furthermore, by the use of the cover-plates 15, secured to the I-shaped bolster-fillers (which fillers are sometimes called "flying transoms") on each side of the center sill, I obtain an extremely strong connection at this point, and by extending the end floor-sheet inwardly beyond the bolster the said sheet also adds to the section of the top cover-plate.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. A steel car having a cover-plate extending transversely under the floor-plates above the bolster and secured to the flying transoms of the bolster on both sides of the center sill; substantially as described.

2. In a car, the combination with end and side sills, of center sills, body-bolsters, floor-plates, serving as cover-plates for the center sill and body-bolsters, and reinforcing-plates for the body-bolsters, said plates being arranged under the floor-plates and above the bolsters; substantially as described.

3. In a car, the combination with center and end sills, of Z-shaped side sills, floor-beams extending from the side to the center sills, floor-plates riveted to the top flanges of said parts, and side walls in the form of plate-girder webs which are secured to the vertical webs of the side sills; substantially as described.

4. In a car, the combination with center and end sills, of Z-shaped side sills, body-bolsters, floor-sheets riveted to the top flanges of said parts and forming cover-plates for the body-bolsters and center sill, end walls, and side walls, said side walls being provided with compression-flanges along their upper edges and being secured to the vertical webs of the side sills, which serve as tension-flanges, said side walls in conjunction with said flanges acting as plate-girders and assisting in carrying the load; substantially as described.

5. In a car, the combination with end, center and side sills, said side sills being Z-shaped with their bottom flanges presented outwardly and their top flanges presented inwardly, body-bolsters, floor-beams intermediate the body-bolsters and attached to the center and side sills, end floor-sheets 7, side floor-sheets 9, and a center floor-sheet 10; substantially as described.

6. In a car, the combination with end, center, and side sills, said side sills being Z-shaped with their bottom flanges presented outwardly and their top flanges presented inwardly, body-bolsters, floor-beams intermediate the body-bolsters and attached to the center and side sills, end floor-sheets 7, side floor-sheets 9, a center floor-sheet 10, end walls, and side walls riveted to the vertical webs of the side sills, and being provided with angles at their upper edges, said side walls serving in conjunction with the angles and side sills as plate-girders to carry a portion of the load; substantially as described.

7. A gondola-car side having an upper angular flange and a flanged side sill riveted to the lower edge of said car side; substantially as described.

8. A gondola-car side having an L-angle riveted along its upper edge and a flanged side sill riveted along its lower edge, the floor-sheet being secured to the upper flange of the side sill; substantially as described.

9. A gondola-car side having an angle riveted to its upper edge and a side sill riveted to its lower edge, said side sill having top and bottom flanges, the bottom flange being coincident with the lower edge of the car side, and the top flange providing a support for the floor-sheets; substantially as described.

In testimony whereof I hereunto affix my signature, in the presence of two witnesses, this 4th day of December, 1902.

GEORGE I. KING.

Witnesses:
JOHN H. FRANK,
WM. A. CROLL.